United States Patent

Tsumura et al.

[15] 3,692,896

[45] Sept. 19, 1972

[54] PROCESS FOR THE PREPARATION OF WATER-SOLUBLE TABLETS

[72] Inventors: Jusha Tsumura, Tokyo; Isumi Imaseki, Tokyo; Michio Nagasawa, Shizuoka-ken, all of Japan

[73] Assignee: Isumura Juntendo Co., Ltd., Tokyo, Japan

[22] Filed: March 3, 1971

[21] Appl. No.: 120,709

Related U.S. Application Data

[63] Continuation-in-part of Ser. No. 783,716, Dec. 13, 1968, abandoned.

[30] Foreign Application Priority Data

June 14, 1968 Japan ..................... 43/40601

[52] U.S. Cl. .................... 424/78, 99/77.1, 99/140, 264/123, 264/300, 424/44, 424/358
[51] Int. Cl. .................................................. A61j 3/10
[58] Field of Search ......... 424/358, 78; 99/77.1, 140; 264/117, 123, 300

[56] References Cited

UNITED STATES PATENTS

| | | |
|---|---|---|
| 3,424,842 | 1/1969 | Nurnberg ............... 424/227 X |
| 3,347,682 | 10/1967 | Rosenstein et al. .... 424/361 X |
| 3,459,858 | 8/1969 | Granatek et al. .......... 424/227 |
| 3,511,914 | 5/1970 | Wolkoff et al. ............ 424/263 |

OTHER PUBLICATIONS

Miller et al. J.A.Ph.A. Sci. Ed. 43(8); 486– 488 Aug. 1954 " The Use of Polyethylene Glycol as a Binder in Tablet Compression"

*Primary Examiner*—Shep K. Rose
*Attorney*—Sughrue, Rothwell, Mion, Zinn & Macpeak

[57] ABSTRACT

There is provided, a process for the preparation of quickly dissolving water-soluble, clear, aqueous solution forming tablets, which comprises:

(a) directly compressing by means of a single punching tablet machine, having an upper punch and a lower punch, a mixture obtained by mixing powder or powders of water-soluble main ingredients with supermicro particle powdered polyethylene glycol 4,000, 6,000, and mixtures thereof, as the essential direct compression tablet lubricant, with required water-soluble conventional tablet diluents, binders, and disintegrants, and (b) subsequently, ejecting the tablets thus produced from said machine, the improvement which comprises compressing with the upper punch with an upper punch pressure of 2,000 Kg., while maintaining said upper punch and said lower punch at a pressure sufficient to create a transmission value to the fixed lower punch of greater than 85, which value is derived from the following formula:

Transmission value = (pressure of lower punch/pressure of upper punch) × 100 when supermicro particle powdered polyethylene glycol having a particle size ranging from 1.0 to 5.0 microns, is provided as the essential direct compression tablet lubricant, said improvement enhancing lubricity during direct compression at an upper punch pressure of 2,000 Kg., and thus reducing the 70 Kg., ejection force required for ejecting such tablets from said machine to below 70 Kg.

8 Claims, No Drawings

PROCESS FOR THE PREPARATION OF WATER-SOLUBLE TABLETS

CROSS-REFERENCES TO RELATED APPLICATIONS

This is a continuation-in-part application of U.S. Ser. No. 783,716 filed Dec. 13, 1968, now abandoned, claiming priority based on Japanese Pat. application No. Sho 43-40601 filed June 14, 1968.

BACKGROUND OF THE INVENTION

1. Field of the Invention

The present invention relates to a process for the production of water-soluble tablets. More particularly, it relates to a process for the production of water-soluble tablets which comprises directly compressing a powder mixture obtained by mixing a powder or powders of water-soluble main ingredients with super micro particle powder of polyethylene glycol having a particle size of less than $50\mu$ and, if necessary, powders of water-soluble vehicles and others to form tablets.

2. Description of the Prior Art

The tablet is a type often used in the fields of pharmaceutical and confectionery industries, because of its considerable beneficial properties. The tablet consists of the following components: (1) main ingredients; (2) lubricants (which prevent sticking of materials, i.e. granules or powders to punches and dies, transmit compressed force uniformly to the material to be molded on compressing, cause easy separation of the molded tablets from punches and dies and also give luster to tablets); and (3) a vehicle (which includes diluents, binders, disintegrators, plasticizers and the like), and is most often prepared by the compressed tablet method. Occasionally (3) may be omitted.

As for the compressed tablet method, generally two methods are applied; namely, the wet granulation method and the direct compression method. In the former method powders of main ingredients are previously granulated and then the granules are compressed into tablets. Generally, there are two methods for carrying this out. In one method, powders of the main ingredients are added to a solution of suitable binders and the mixture is kneaded, granulated and dried to form granules. Then the granules are compressed with the addition of lubricants. In the other method, the main ingredients are added to a solution or suspension of lubricants in a solvent containing suitable binders and the mixture is kneaded, granulated and dried to form granules. Then the granules are compressed into tablets. In the latter method, on the contrary, tablets are prepared by compressing with a powder or powders of lubricants and/or vehicle.

The direct compression method has the following advantages and recently has become more popular with the progress of the tablet machine:

1. Even with substances unstable against water and heat, they can be easily molded into tablets and are chemically stabilized according to the method.
2. Because the method consists of two processes, namely mixing and compressing, reduction of processing time and cost can be achieved. (Wet granulation method, on the contrary, demands five processes, namely mixing, kneading, granulating, drying and compressing.)
3. The method requires no specific technique and the quality of the product is uniform.
4. Satisfactory releasing of main substances can be obtained, due to disintegration of the particles of the active substances.

Water-soluble tablets hitherto, however, were always prepared by the wet granulation method and notwithstanding the above-mentioned advantages, the direct compression method has never been used for the preparation of water soluble tablets. This is because no water-soluble lubricants which act efficiently in the operation of the direct compression method have been found and water-soluble tablets cannot be obtained by the direct compression method. If the lubricants used do not act effectively, there is required a large compression force and the compression force will be distributed disuniformly to the powder material to be shaped. Consequently, there occur troubles, such as capping, sticking and laminating of the tablets formed. Subsequently, the tablet machine will be destroyed due to too heavy burden. As the granulated material has satisfactory compression molding ability and being of smaller surface area in the material, the wet granulation method may be widely used, only if lubricants of having their action is used. Whereas in the direct compression method lubricants having particularly excellent efficacy and suitable for the direct compression method should be used, because the surface area of the powder material is several times larger than that of the granules. In addition, the compressing force should be raised because of the difficulties in the direct compression molding of tablets from the powder material. Almost all of lubricants used for the preparation of tablets hitherto have been non-water-soluble except for polyethylene glycol 4000 and 6000 (PEG 4000 and 6000), which are both water-soluble. Furthermore, if coarse powder (60~80 mesh: corresponds to particle size of $221\sim 173\mu$) of PEG 4000 or 6000 is used in the direct compression method, water-soluble tablets can not be obtained; therefore, for the preparation of water-soluble tablets hitherto the so-called wet granulation method, which comprises granulating a powder of main substances and then compressing the granules with addition of coarse powder of PEG 600 or 4000 ($60\sim 80$ mesh or $221\sim 173\mu$) or granulating a powder of active substances with addition of a solution of PEG 6000 or 4000 and then compressing the granules to form tablets, has been inevitably employed. In practice, when sodium bicarbonate as main ingredient and coarse powder of PEG 6000 ($60\sim 80$ mesh or $221\sim 173\mu$) as lubricants are used, the wet granulation method can be used for the preparation of tablets whereas the direct compression method is impossible to use for the same purpose, because the tablet machine creaks and then stops during the operation.

In the wet granulation method, water-soluble lubricants, such as boric acid, sodium benzoate and fatty acid esters of sucrose may be used, whereas in the direct compression method it is impossible to prepare water-soluble tablets by using these materials.

SUMMARY OF THE INVENTION

It has now been surprisingly found that water-soluble tablets can easily be obtained by the direct compression method employing super micro particle powder of PEG having a particle size of less than $50\mu$ and preferably $1-10\mu$ and $1-5\mu$ respectively, which have never been used hitherto, as a lubricant. Based on this finding, the present invention has been accomplished.

As to the water-soluble main ingredients used according to the present invention, any suitable water-soluble substance may be used. These include, for example, water-soluble medicines such as ascorbic acid, thiamine hydrochloride, taurin, amino acids, sulpyrine, caffeine, chlorophenylamine maleate and the like; water-soluble additives to foods such as sweeteners, such as dextrose, sucrose and the like; organic acids, such as citric acid, malic acid, tartaric acid and the like; colors, flavors, preservatives, such as sodium dehydroacetate and the like; water-soluble chemicals, such as sodium perborate, potassium cyanide and the like; water-soluble agricultural chemicals, such as sodium pentachlorophenylamate, kasugamycin, glasticidin S and the like. These ingredients are used alone or in a suitable combination thereof, and they are used in a form of a powder for compression.

DETAILED DESCRIPTION OF THE INVENTION

The super micro particle powder of PEG having particle size of less than $50\mu$ used according to the present invention can only be obtained by pulverizing PEG with supersonic air current jet mill, which pulverizes a material by jetting or impacting of mixed particle current employing supersonic air current. Using a conventional mill such as ball mill, pulverizer, micro mill and the like, it is difficult to obtain PEG powder of super micro particles and even if a special pulverizing method is used, PEG obtained is of at most only in a level of about 100 mesh (about $140\mu$). It has now been found that the PEG powder having the desired particle size of the present invention can only be obtained by pulverizing by means of the said jet mill. It exhibits an excellent lubricating effect when used in the direct compression method.

The excellent lubricating effect of the super micro particle powder of PEG having particle size of less than $50\mu$ compared with coarsely powdered PEG can be seen from the following experimental results, as follows:

In the experiment, a single punching tablet machine of only the one side compression type (fixing one of upper and lower punch, and moving the other punch and compressing with it) (a single punching machine manufactured by Erweka) is used and the rate of the pressure transmitted to the lower punch by compressing only with the upper punch while the lower punch is fixed, is shown in the following expression (R):

transmission value R = (pressure of lower punch/pressure of upper punch) × 100

Also, the ejection force to push out the molded tablet from the die by the lower punch are measured and these are compared. When the value R is more than 85, the direct compression method may be used and the lower the rejection force will be, being the more effective in lubricating action.

For preparing tablets it is necessary to use lubricants. Though it is preferable to use lubricants having no interaction with the main ingredient, there are no such lubricants which will fully satisfy the above said conditions. From this standpoint it is important to use lubricants as little as possible in quantity.

On the other hand, it is generally preferable to lower the ejection force, considering from the load of tablet machine. When the ejection force is less than 70 kg, tablets can be prepared over long periods of time.

As mentioned above, direct compression is also possible in the range of R>85.

The present invention has attained such new and unexpected results that by using polyethylene glycol having a particle size of 1 to 10 microns and preferably 1 to 5 microns, as lubricants, excellent water-soluble tablets can be prepared over long periods of time using only small amounts of polyethylene glycol, under the conditions of R>85 and an ejection force of less than 70 kg.

The powder and formula used in the experiment are as follows:

| | |
|---|---|
| sodium bicarbonate (150 mesh) | 95 ≈ 99.75% |
| PEG 6000 (having particle sizes shown in Table I) | 5 ≈ 0.25% |

The tablet is molded in diameter of 20 mm and thickness of 5 mm with the upper punch pressure of 2,000 kg. Results are shown in Table I, in detail:

TABLE I

| Particle Size | PEG Added (%) | R (%) | Ejection Force (kg) |
|---|---|---|---|
| 200μ | 1 | 70.2 | 420 |
| | 3 | 74.3 | 310 |
| | 5 | 78.1 | 250 |
| | 10 | 79.3 | 210 |
| 50μ | 1 | 85.2 | 170 |
| | 2 | 88.7 | 150 |
| | 3 | 90.3 | 120 |
| | 5 | 93.3 | 105 |
| 10μ | 1 | 92.3 | 90 |
| | 2 | 95.9 | 70 |
| | 3 | 96.4 | 60 |
| 7μ | 1 | 94.5 | 80 |
| | 2 | 96.0 | 60 |
| | 3 | 96.0 | 50 |
| 5μ | 0.5 | 88.7 | 70 |
| | 1 | 97.0 | 60 |
| | 2 | 96.3 | 50 |
| | 3 | 96.0 | 30 |
| 3μ | 0.5 | 90.6 | 65 |
| | 1 | 96.4 | 50 |
| | 2 | 97.0 | 45 |
| 1μ | 0.2 | 89.1 | 65 |
| | 0.5 | 93.5 | 60 |
| | 1 | 96.7 | 30 |
| | 2 | 97.0 | 25 |

As can be seen from the Table I, super micro particle powders of PEG having particle size of less than $50\mu$ are particularly excellent in lubricating effect in direct compression method compared with the coarsely powdered PEG.

According to the present invention, any super micro particle powder of PEG having particle size of less than $50\mu$ may be used for the direct compression method; however, it is particularly suitable to use the super micro particle powder of PEG in the level of $1-10\mu$ and $1-5\mu$. It is preferable to use about 0.2~10.0 percent and most preferable to employ 0.2~5.0 percent by weight of the super micro particle powder of PEG based on the weight of the water-soluble tablet.

In the production of water-soluble tablets according to the present invention, if required, water-soluble vehicles, such as diluents, binders, disintegrators, plasticizers, etc., and further water-soluble colors, flavors, spices and the like may be added therein. As examples of water-soluble vehicles are lactose, dextrose, sucrose, sodium bicarbonate, water-soluble inorganic salts and the like.

The present invention, as mentioned above, has made it possible to prepare the water-soluble tablets with ease by means of the direct compression method by which it was thought to be impossible to prepare the water-soluble tablets. Therefore, the present invention is a very advantageous process for preparation of water-soluble tablets.

A better understanding of the present invention will be attained from the following examples, which are merely illustrative and not limitative of the present invention. "Percent" means percent by weight.

EXAMPLE 1

| | |
|---|---|
| Ascorbic acid | 30% |
| Lactose powder | 69% |
| PEG 6000 powder (having particle size of about 5μ) | 1% |

The above powder ingredients are mixed together homogeneously and compressed by rotary tablet machine to form tablets of 1 g each in weight. After compressing of 5,000 tablets continuously nothing unusual was observed in the operation of the tablet machine and in tablets obtained. Thus, white and lustrous surfaced tablets are obtained. When the tablet thus obtained is dropped into water, it dissolves quickly to form a clear solution. When ascorbic acid is processed by wet granulation method into tablets, it deteriorates, whereas when it is processed into tablets by the present method, it does not deteriorate.

EXAMPLE 2

| | |
|---|---|
| Powdered Ext. of Glycyrrhiza | 20% |
| Lactose powder | 79% |
| PEG 6000 (super micro particles of 5μ) | 1% |

Above powder ingredients are mixed together homogeneously and compressed by rotary tablet machine to form light brownish tablets of each 1 g in weight. When the tablet thus obtained is dropped into water, it forms clear solution dissolving quickly. When powdered Ext. of Glycyrrhiza is processed by wet granulation method into tablets it deteriorates, whereas when it is processed by the present method into tablets it does not deteriorate.

EXAMPLE 3

| | |
|---|---|
| Sodium perborate powder | 99% |
| PEG 4000 (super micro particles of 5μ) | 1% |

Above powder ingredients are mixed together homogeneously and the mixture is compressed with rotary tablet machine to form tablets of 1 g in each weight. When a tablet thus obtained is dropped into water it forms a clear solution dissolving quickly.

EXAMPLE 4

| | |
|---|---|
| Potassium bromide powder | 99% |
| PEG 6000 (super micro particles of 5μ) | 1% |

Above powder ingredients are mixed together homogeneously and compressed into tablets of 1 g in each weight with rotary tablet machine. When the tablet thus obtained is dropped into water it forms a clear solution dissolving quickly.

EXAMPLE 5

| | |
|---|---|
| Anhydrous sodium sulfate powder | 70% |
| Borax powder | 15% |
| Sodium sesquicarbonate powder | 11% |
| Flavor (Lemon Micron) | 2% |
| Color (uranine) | 1% |
| PEG 6000 (super micro particles of 5μ) | 1% |

Above powder ingredients are mixed together homogeneously and compressed into tablets of 10 g in each weight. When the tablet thus obtained is dropped into water, it forms a clear flavored solution.

EXAMPLE 6

| | |
|---|---|
| Glucose powder | 80% |
| Sodium cyclamate powder | 5% |
| Sodium citrate powder | 10% |
| Sodium glutamate powder | 1% |
| Flavor (Orange Micron R) | 2% |
| Color (FD&C Yellow No. 5) | 1% |
| PEG 4000 (super micro particles of 5μ) | 1% |

Above powder ingredients are mixed together homogeneously and compressed into tablets of 5 g in each weight. When the tablet thus obtained is dropped into water, it forms a clear flavored solution.

EXAMPLE 7

| | |
|---|---|
| Ascorbic acid powder | 60% |
| Glucose powder | 39.8% |
| PEG 6000 (super micro particles of about 1μ) | 0.2% |

Above powder ingredients are mixed together homogeneously and the mixture is compressed with a rotary tablet machine to form tablets of 500 mg in each weight. When a tablet thus obtained is dropped into water it forms a clear solution dissolving quickly.

EXAMPLE 8

| | |
|---|---|
| Caffeine powder | 40% |
| Lactose powder | 59.5% |
| PEG 7500 (super micro particles of about 3μ) | 0.5% |

Above powder ingredients are mixed together homogeneously and the mixture is compressed with a single punch tableting machine to form tablets of 100 mg in each weight. When a tablet thus obtained is dropped into water it forms a clear solution dissolving quickly.

EXAMPLE 9

| | |
|---|---|
| Borax powder | 50% |
| Sodium bicarbonate powder | 15% |
| Citric acid powder (coated with water-soluble material) | 32% |
| PEG 20,000 (super micro particles of about 7μ) | 3% |

Above powder ingredients are mixed together homogeneously and the mixture is compressed with a single punch tableting machine to form tablets of 10 g in each weight. When a tablet thus obtained is dropped into water it forms a clear solution dissolving quickly under foaming.

EXAMPLE 10

| Sodium salt of copper-chlorophilline powder | 95% |
| --- | --- |
| PEG 6000 (super micro particles of about 10μ) | 5% |

Above powder ingredients are mixed together homogeneously and the mixture is compressed with a rotary tablet machine to form tablets of 50 mg in each weight. When a tablet thus obtained is dropped into water it forms a clear, green solution dissolving quickly.

Although the present invention has been adequately described in the foregoing specification and examples included therein, it is readily apparent that various changes and modifications may be made without departing from the scope thereof.

What is claimed is:

1. A process for the preparation of quickly dissolving water-soluble, clear, aqueous solution forming tablets, which comprises:
   a. directly compressing by means of a single punching tablet machine, having an upper punch and a lower punch, a mixture obtained by mixing powder or powders of water-soluble main ingredients with super-micro particle powdered polyethylene glycol 4,000, 6,000, and mixtures thereof, as the essential direct compression tablet lubricant, with required water-soluble conventional tablet diluents, binders, disintegrants, and
   b. subsequently ejecting the tablets thus produced from said machine,
   the improvement which comprises compressing with the upper punch with an upper punch pressure of 2,000 Kg., while maintaining said upper punch and said lower punch at a pressure sufficient to create a transmission value to the fixed lower punch of greater than 85, which value is derived from the following formula:

Transmission = (pressure of lower punch/pressure of upper punch) × 100 when supermicro particle powdered polyethylene glycol having a particle size ranging from 1.0 to 5.0 microns, is provided as the essential direct compression tablet lubricant,
   said improvement enhancing lubricity during direct compression at an upper punch pressure of 2,000 Kg., and thus reducing the 70 Kg., ejection force required for ejecting such tablets from said machine to below 70 Kg.

2. The process of claim 1, wherein the particle size of said powdered polyethylene glycol is 1 micron.

3. The process of claim 1, wherein the particle size of said powdered polyethylene glycol is 3 microns.

4. The process of claim 1, wherein said powdered polyethylene glycol is added in an amount of from 0.2 to 10.0 percent.

5. The process of claim 1, wherein said powdered polyethylene glycol is added in an amount from 0.2 to 5.0 percent.

6. The process of claim 1, wherein the water-soluble main ingredient is a water-soluble medicine.

7. The process of claim 1, wherein said mixture further comprises a vehicle comprising one or more substances selected from the group consisting of bases, plasticizers, colors, flavors and spices.

8. The quickly dissolving water-soluble, clear, aqueous forming solution tablet produced by the process of claim 1.

* * * * *

UNITED STATES PATENT OFFICE
CERTIFICATE OF CORRECTION

Patent No. 3,692,896　　　　　　　　　Dated September 19, 1972

Inventor(s) Jusha Tsumura et al

It is certified that error appears in the above-identified patent and that said Letters Patent are hereby corrected as shown below:

In The Heading:

Second Inventor's first name is misspelled. Should Read:
--Izumi--

Assignee's name misspelled. Should Read:
--Tsumura Juntendo Co., Ltd. --

Signed and sealed this 8th day of May 1973.

(SEAL)
Attest:

EDWARD M. FLETCHER, JR.　　　　　　　ROBERT GOTTSCHALK
Attesting Officer　　　　　　　　　　　Commissioner of Patents